UNITED STATES PATENT OFFICE.

No. 185,456

JAMES L. ROWLAND, OF NEW YORK, N. Y.

IMPROVEMENT IN THE MANUFACTURE OF ARTIFICIAL STONE.

Specification forming part of Letters Patent No. 185,456, dated December 19, 1876; application filed November 13, 1876.

*To all whom it may concern:*

Be it known that I, JAMES L. ROWLAND, of the city and county of New York, and State of New York, have invented certain new and useful Improvements in the Manufacture of Artificial Stone; and I do hereby declare the following to be a full, clear, and exact description of the same, sufficient for those skilled in the art to which this invention appertains to make and use the same.

The object of this invention is to improve artificial stone, and the various articles which have been or may be made thereof, in respect to durability, strength, appearance, grain, texture, and wear; and to this end the invention consists, first, in an artificial stone made of finely-pulverized quicklime, mixed with hydraulic limes or cements, or of certain metallic bases, any one of which, by the reagents—water and carbonic dioxide—may be reconverted into stone, molded into suitable forms, and artificially indurated; secondly, in the process of making such artificial stone; and, lastly, in the application of such stone as a facing or surfacing for concrete blocks or other articles, substantially as I will now proceed to set forth.

In the manufacture of my improved artificial stone the important steps are, first, the selection and pulverization of the materials; secondly, the mixing and tempering of the stone paste or mortar; thirdly, the molding and pressing of the mortar into suitable forms; and, lastly, the induration of the articles so molded and pressed.

In the selection of the materials I take any suitable quicklime and hydraulic lime, or any of the various calcareous or magnesian hydraulic cements, imported or native, as may be best adapted for the special article which it is designed to produce. The hydraulic limes and cements, if not sufficiently fine, are finely pulverized by grinding or any competent means, and are thoroughly screened, or otherwise treated, so as to remove all coarse particles or foreign substances, and leave nothing but fine dust or flour of cement or lime. The quicklime is to be slaked, and this should be done in such a manner as to avoid using any excess of water above what is necessary to reduce it to a fine powder, when it is also passed through a bolt or sieve in the same manner as the hydraulic limes.

I prefer vapor of water, steam, or fine spray for the purpose, as it enables me to control the application of the moisture to better advantage, and carbonic dioxide may be commingled with the vapor or steam, if preferred.

The materials having been thus selected and prepared, the next step is to properly mix and temper them in making the mortar, and this varies somewhat, according to the article to be made, and the color and quality of stone to be produced. For example: from one to two parts of slaked quicklime or hydrate of lime, combined with four parts of Louisville cement or hydrate of lime. Rosendale and Louisville cements, equal parts of each, combined with one another, make a strong and compact stone of closer texture, but very similar in other qualities and appearance to one composed wholly of Portland cement; while, by varying the proportions of each, or by using hydraulic limes or cements differing one from another in color and composition alone, or in combination two or more with one another, or with hydrate of lime, and varying the proportions of each, innumerable varieties of texture, quality, color, and appearance may be produced, which it is impossible here to set forth, and which any workman must determine for himself, according to the requirements of the article he designs to produce. Also, the imported and native cements, in equal parts of each, and other proportions, combined or not with hydrate of lime, give efficient results, and make a very strong and desirable stone. I may say here, however, that the quicklime, when used, as described, in combination with some one or more of the hydraulic cements or limes, and made a part of the composition of the stone, has the effect to give the stone produced (the same as when made of béton and concrete mixtures used in the manufacture of stone) a lighter shade of color, to improve the grain, texture, and strength of the material, and to prevent surface checking or cracking, and also efflorescence. It also serves, with the water, as a tempering medium for the material with which combined, improves the tempering of the mixture the same as it improves the tempering of concrete and béton mixtures when used in those, imparting to it a slippery talcous quality, by reason of which it may be more compactly pressed into the molds. For this purpose the hydrate of lime is preferably mixed with the other material or materials before adding the water.

The materials having been selected, and (if two or more are to be used in combination) properly proportioned according to the effect required, they are then to be reduced to a mortar, and in the tempering of this mortar the main requirement is to impart to it a condition and consistence adapting it to be most compactly pressed while in the molds. To this end any excess of moisture in the mixing and tempering must be carefully avoided on account of the incompressibility of free water, and its tendency to intervene between the particles of mortar, and prevent their perfect union.

Any suitable mode of incorporating the water in the proper quantities with the other materials, to form and temper the mortar, may be employed, as, for example, by the application of vapor, steam, spray, or water in other forms. When vapor or steam is employed, suitable mechanical appliances should be used for confining the materials with the moisture, and thoroughly commingling them. For such purpose I find a hollow polygonal horizontal rotating vessel for containing mortar, provided with a perforated axial pipe, or other means for introducing the vapor or steam, and radial arms or stirrers, if desired, for agitating the contained mass, to be a very efficient apparatus. When spray is to be used, a convenient mode of operation is to put the materials in a pile on a smooth water-tight floor, dampen a part of the floor near the pile by means of a rose sprinkler, gradually and evenly rake the materials onto the dampened portion of the floor, and collect them again in a pile, sprinkling or spraying water evenly and in properly graduated quantities upon the mass while moving it; then immediately rake it back, spraying water meanwhile in diminished quantities upon it, and then, without further applications of spray, thoroughly intermix it by raking or otherwise. In applying the water in any of these ways the workman must determine when to cease the application of the moisture by his observation of the color and appearance of the mortar. So long as the moisture is insufficient, the mass will exhibit a spotted or streaked appearance and an unevenness of shade or color; but at the stage of treatment when it has received sufficient moisture, it will immediately assume a uniform shade of color and a curdling appearance, and will manifest a tendency to aggregate in small lumps. The application of moisture should then be discontinued, and the intermixing of the materials proceed until completed.

At any stage of the process, preferably when the materials are placed in the vessel or on the floor for mixing and tempering, suitable dyes or pigments, such as the metallic oxides, for example, may be employed to impart any desired color or colors to the article to be produced; but if used in the form of a powder, and not in solution, intermixed before water is added.

After the mortar has been thus prepared and tempered, it is put into suitable molds to form the required article or articles, and is therein compressed and compacted by any form of press or suitable means, and with any required degree of force. The articles are then removed from the molds and artificially indurated by any suitable means, such, for example, as by subjecting them to any of the indurating processes described in my Letters Patent No. 109,669, dated November 29, 1870; No. 128,980, dated July 16, 1872; No. 137,322, dated April 1, 1873, reissued January 12, 1875, No. 6,234, and again reissued April 25, 1876, No. 7,084; No. 149,682, dated April 14, 1874; and No. 153,020, dated July 14, 1874, or by covering them from the sun's rays and treating them daily with water in the form of spray, or with water, saturated with carbonic dioxide. The process of indurating in a closed chamber, however, as described in several of my said patents, gives the best results.

It will be observed that in the process above described no sand or gravel is employed, nor is any part of the material applied in grains or lumps, but in a fine or pulverized state. The object of this is to enable the carbonic acid or dioxide, subsequently applied, to unite chemically with each particle of lime recouvertible matter in the compound, thereby forming a compact stone, consisting, as nearly as possible, of homogeneous and uniform carbonate matter, except so far as it may be modified by the presence of the clays contained in the cements. The selection, pulverization, and screening of the materials, and the careful application of the water thereto, followed by the artificial induration, are all adapted to this end, and are all essential in practice to a perfectly-successful result.

A colorable variation of my process might, of course, be employed by introducing minute quantities of sand, which would not materially affect the result; but, so far as such sand may be used, it will not subserve any useful purpose in the manufacture, and, therefore, should be altogether avoided and guarded against.

The stone or tile produced as above described possesses several very important advantages over other artificial stones heretofore produced, among which may be mentioned its tenacity and durability, its fine grain and close and homogeneous texture, and the fact that its surface will neither glaze and become slippery, marble-like, vitreous, or metal-like by wear, nor, on the other hand, will it scour and become scratched and rough, but will take on a smooth and slate-like surface, due probably to the presence of the argillaceous materials in the cements when combined, in fine dust, with the water and carbonic acid or dioxide, in the manner described, which especially fits the stone for pavements and other similar purposes, while by properly adapting the proportion of quicklime in the composition its capacity to receive a surface-polish like marble may be increased at will, which adapts it to the manufacture of mantels, wainscoting, and other articles where smoothness or polish of surface may be required.

For certain purposes the tiles or other articles made wholly of the fine materials herein described may be more expensive than is necessary, and for other purposes the smoothness of surface and fineness of grain may not enable the tile to adhere readily and tenaciously to the bed or wall of which it is to form a part, or to the mortar or cement in which it is to be laid. In such cases I apply the fine material herein described merely to facing the tile or other article, and I make the body or posterior side of the tile of coarser material, using concrete made of gravel or sand and mortar, or any of the known concretes, or coarse artificial-stone compositions for such body or back. In such case an advantageous mode of procedure is as follows, viz: Having prepared the fine mortar for the facing and the coarse concrete mortar for the body or back, I spread lightly and evenly over the bottom of the mold a quantity of the fine mortar sufficient to form a substantial layer or a facing of the required thickness, and then I put lightly and evenly in the mold, in contact with the upper surface of the fine mortar, a quantity of the coarser mixture or concrete sufficient to form the body of the block intended. In the same manner, or with modifications required by the different forms of articles or manufactures to which the facing is applied, the materials are put into the molds for reservoir-linings, or for forming water or gas surfaces. After the materials have been thus placed in the molds strong compression is applied, and the two layers of different substances thereby so intimately joined that, after the block or other manufacture has been indurated, no separation of the two layers is possible.

I am aware that artificial-stone manufactures for various purposes have been made with a surface of finer and a back or body of coarser material; and I am also aware that it is not new to make artificial stone of quicklime or hydraulic cements mixed with coarser materials, with which these substances form no chemical union. To these I lay no claim; nor do I claim the modes of indurating, nor the modes of tempering, the materials, except in relation to the quicklime, which has been described.

I claim as my invention—

1. An artificial stone composed of quicklime, or hydrate of lime, and a hydraulic lime or hydraulic cement, compressed into molds and indurated, as set forth.

2. An artificial stone having a facing of quicklime and hydraulic lime or cement, or of either alone, said facing being united to the body of the block, as set forth.

3. As an improvement in the manufacture of artificial stone, the described process of mixing and tempering the materials—viz., by pulverizing the hydraulic cements, adding thereto the hydrate of lime, likewise finely divided, and then moistening the mixture, and finally compressing and indurating, as set forth.

4. The described process of forming the facing of lime or cement by first placing a layer of the fine material in the mold, and then filling with the coarser to form the body of the block or other article, and then compressing, as and for the purposes set forth.

JAMES L. ROWLAND.

Witnesses:
JOHN RUSSELL,
JAS. F. ROBINSON.